United States Patent
Kenchareddy et al.

(10) Patent No.: US 8,145,164 B2
(45) Date of Patent: Mar. 27, 2012

(54) METHODS AND APPARATUS FOR HANDLING A SIGNALING MESSAGE THE RELATES TO TRANSMISSION RATE RESTRICTIONS

(75) Inventors: Sanjay Kenchareddy, San Diego, CA (US); Daniel Amerga, San Diego, CA (US); Masato Kitazoe, Hachiouji (JP); Preeti Srinivas Rao, Karnataka (IN); Srividhya Krishnamoorthy, San Diego, CA (US); Suresh Sanka, Andhra Pradesh (IN)

(73) Assignee: Qualcomm Incorporated, San Diego, CA (US)

( * ) Notice: Subject to any disclaimer, the term of this patent is extended or adjusted under 35 U.S.C. 154(b) by 823 days.

(21) Appl. No.: 12/186,361

(22) Filed: Aug. 5, 2008

(65) Prior Publication Data
US 2009/0221250 A1    Sep. 3, 2009

Related U.S. Application Data

(60) Provisional application No. 61/032,305, filed on Feb. 28, 2008.

(51) Int. Cl.
 *H04B 7/00* (2006.01)
 *H04B 17/00* (2006.01)
(52) U.S. Cl. .............. 455/230; 455/226.1; 455/67.11
(58) Field of Classification Search .......... 455/434, 455/509, 511, 522, 67.11, 115.1, 115.3, 450, 455/226.1, 230; 370/310, 335, 342
See application file for complete search history.

(56) References Cited

U.S. PATENT DOCUMENTS

| | | | | |
|---|---|---|---|---|
| 6,366,763 | B1* | 4/2002 | Ue et al. | 455/69 |
| 6,735,420 | B2* | 5/2004 | Baldwin | 455/127.2 |
| 6,775,541 | B2* | 8/2004 | Dillon et al. | 455/422.1 |
| 6,904,021 | B2* | 6/2005 | Belcea | 370/252 |
| 6,909,905 | B2* | 6/2005 | Umeda et al. | 455/522 |
| 7,408,880 | B2* | 8/2008 | Xiao et al. | 370/235 |
| 7,539,165 | B2* | 5/2009 | Toskala et al. | 370/335 |
| 2008/0045164 | A1* | 2/2008 | Usuda et al. | 455/95 |
| 2009/0036139 | A1* | 2/2009 | Usuda et al. | 455/450 |

(Continued)

FOREIGN PATENT DOCUMENTS

| EP | 1677563 A1 | 7/2006 |
|---|---|---|
| WO | WO03100989 A2 | 12/2003 |

OTHER PUBLICATIONS

ETSI: "ETSI TS 125 331 V8.1.0 (Jan. 2008)—Radio Resource Control (RRC); Protocol Specification (Selection of chapters)" [Online] Feb. 1, 2008, XP002528715 ETSI Retrived from the Internet: UPL:www.etsi.org> [retrieved on May 19, 2008] the whole document.

(Continued)

*Primary Examiner* — Sonny Trinh
(74) *Attorney, Agent, or Firm* — Larry J. Moskowitz; Sayed H. Beladi

(57) ABSTRACT

A method for handling a signaling message that specifies transmission rate restrictions may include operating in a first state. The method may also include receiving the signaling message from a network. The signaling message may include an activation time, the transmission rate restrictions and the control duration. The method may also include receiving a state transition trigger to operate in a second state. The method may also include determining the user equipment's behavior regarding the transmission rate restrictions upon receiving the state transition trigger.

32 Claims, 8 Drawing Sheets

U.S. PATENT DOCUMENTS

2009/0191886 A1* 7/2009 Goto et al. .................... 455/450
2009/0191887 A1* 7/2009 Goto et al. .................... 455/450

OTHER PUBLICATIONS

International Search Report and Written Opinion—PCT/US2009/034436—ISAEPO—Jun. 5, 2009.

Research in Motion: "TFC Subset Variable Usage and Application of Transport format Combination Subset" 3GPP Draft, R2-042393_TFC_Subset_Variable_Usage, 3rd Generation Partnership Project (3GPP). Mobile Competence Centre ; 650, Route Des Lucioles ; F-06921 Sophia-Antipolis Cedex ; France, no. Yokohama, Japan; 20041115, Nov. 9, 2004, XP050127250 the whole document.

* cited by examiner

METHODS AND APPARATUS FOR HANDLING A SIGNALING MESSAGE THE RELATES TO TRANSMISSION RATE RESTRICTIONS

RELATED APPLICATIONS

This application is related to and claims priority from U.S. Patent Application Ser. No. 61/032,305, filed Feb. 28, 2008, for "Handling of Transport Format Combination Control (TFCC) Message Specifying Activation Time and/or Control Duration across State Transitions and Radio Access Technology (RAT) Change," with inventors Sanjay Kenchareddy, Daniel Amerga, Masato Kitazoe, Preeti Rao, Srividhya Krishnamoorthy, and Suresh Sanka, which is incorporated herein by reference.

TECHNICAL FIELD

The present disclosure relates generally to communication systems. More specifically, the present disclosure relates to methods and apparatus for handling a signaling message that relates to transmission rate restrictions.

BACKGROUND

As used herein, the term "user equipment" refers to an electronic device that may be used for voice and/or data communication over a wireless communication network. Examples of user equipment include cellular phones, personal digital assistants (PDAs), handheld devices, wireless modems, laptop computers, personal computers, etc. User equipment (UE) may alternatively be referred to as a mobile station, a mobile terminal, a subscriber station, a remote station, a user terminal, a terminal, a subscriber unit, an access terminal, etc.

A wireless communication network may provide communication for a number of UEs, each of which may be serviced by a base station. A base station may alternatively be referred to as an access point, a Node B, or some other terminology.

A UE may communicate with one or more base stations via transmissions on the uplink and the downlink. The uplink (or reverse link) refers to the communication link from the UE to the base station, and the downlink (or forward link) refers to the communication link from the base station to the UE.

The resources of a wireless communication network (e.g., bandwidth and transmit power) may be shared among multiple UEs. A variety of multiple access techniques are known, including code division multiple access (CDMA), time division multiple access (TDMA), frequency division multiple access (FDMA), and orthogonal frequency division multiple access (OFDMA).

Benefits may be realized by improved systems and methods related to the operation of UEs.

DETAILED DESCRIPTION

Figure 1:
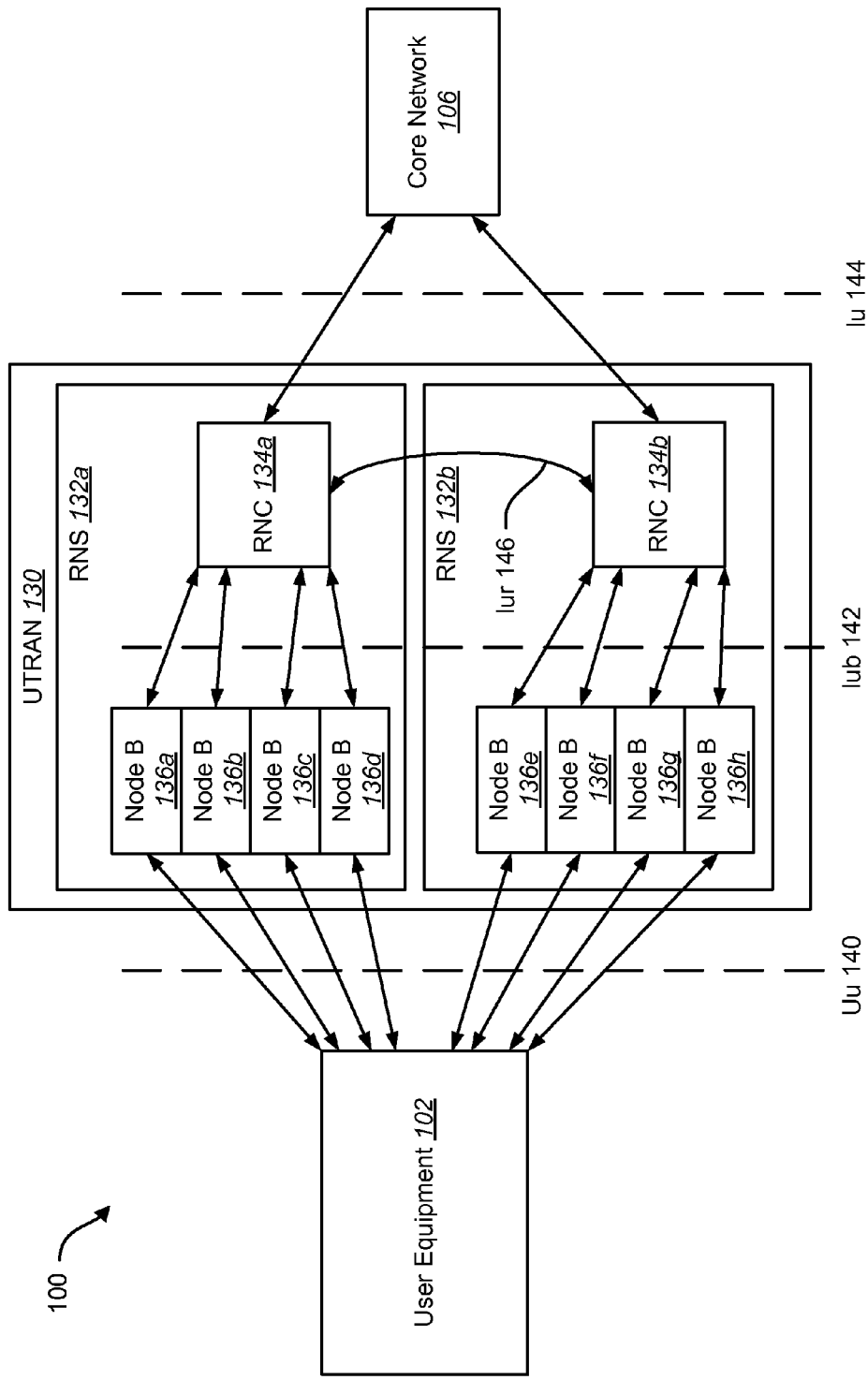
FIG. 1 is a block diagram of a communication system according to the Universal Mobile Telecommunications System (UMTS) network topology.

A method for handling a signaling message that relates to transmission rate restrictions is disclosed. The method may operate in a first state. The signaling message is received from a network. The signaling message includes an activation time and the transmission rate restrictions. A state transition trigger to operate in a second state is received. The user equipment's behavior is determined regarding the transmission rate restrictions upon receiving the state transition trigger. The signaling message may be a transport format combination control (TFCC) message.

Determining the user equipment's behavior regarding the transmission rate restrictions upon receiving the state transition trigger may include determining whether the activation time has been reached. When the activation time has not been reached, determining the user equipment's behavior regarding the transmission rate restrictions upon receiving the state transition trigger may also include determining whether the signaling message includes a control duration.

The signaling message may include the control duration. The transmission rate restrictions may be immediately applied.

The signaling message may not include the control duration. The method may behave as if the control duration has lapsed and remove the transmission rate restrictions. Furthermore, the method may revert back to a transmission rate that the user equipment had prior to receiving the signaling message.

The activation time may be reached. Determining the user equipment's behavior regarding the transmission rate restrictions upon receiving the state transition trigger may further include determining whether a control duration included in the signaling message has lapsed. The control duration may not lapse, and the method may behave as if the control duration has lapsed and remove the transmission rate restrictions. Furthermore, the method may revert back to a transmission rate that the user equipment had prior to receiving the signaling message. The control duration may lapse, and the method may revert back to a transmission rate that the user equipment had prior to receiving the signaling message.

The first state may be a CELL_DCH state. The transmission rate restrictions may apply to an uplink data rate.

User equipment configured to handle a signaling message that relates to transmission rate restrictions is disclosed. The user equipment includes a processor and circuitry coupled to the processor. The user equipment operates in a first state. The signaling message is received from a network. The signaling message includes an activation time and the transmission rate restrictions. A state transition trigger to operate in a second state is received. The user equipment's behavior is determined regarding the transmission rate restrictions upon receiving the state transition trigger.

User equipment configured to handle a signaling message that relates to transmission rate restrictions is also disclosed.

The user equipment includes means for operating in a first state and means for receiving the signaling message from a network. The signaling message includes an activation time and the transmission rate restrictions. The user equipment includes means for receiving a state transition trigger to operate in a second state. The user equipment also includes means for determining the user equipment's behavior regarding the transmission rate restrictions upon receiving the state transition trigger.

A computer-program product for handling a signaling message that relates to transmission rate restrictions is disclosed. The computer-program product comprises a computer-readable medium having instructions thereon. The instructions include code for operating in a first state and code for receiving the signaling message from a network. The signaling message includes an activation time and the transmission rate restrictions. The instructions include code for receiving a state transition trigger to operate in a second state. The instructions also include code for determining the user equipment's behavior regarding the transmission rate restrictions upon receiving the state transition trigger.

Various examples are now described with reference to the drawings. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more examples.

FIG. 1 is a block diagram of a communication system 100 according to the Universal Mobile Telecommunications System (UMTS) network topology. A UMTS system may include user equipment (UE) 102, an access network, and a core network 106. The UE 102 may be coupled to the access network which is coupled to the core network 106 which can be coupled to an external network (not shown).

The UE 102 is generally a device that allows a user to access UMTS network services. The UE 102 may be a mobile device such as a cellular phone, a fixed station, or other data terminal. For example, the UE 102 may be a radio terminal used for radio communications over an air (Uu) interface 140. The Uu interface 140 is the interface through which the UE 102 accesses the fixed part of the system.

The access network may include the radio equipment for accessing the network. In a WCDMA system, the access network is the Universal Terrestrial Radio Access Network (UTRAN) 130 air interface. The UTRAN 130 may include one or more radio network subsystems (RNS) 134 that include at least one base station or "Node B" 136 coupled to at least one radio network controller (RNC) 134.

The RNC 134 may control the radio resources of the UTRAN 130. The RNCs 134a 134b of the access network may communicate with the core network 106 via an interface 144 that may be referred to as the Iu interface 144. An RNC 134 of the access network may communicate with a Node B 136 via an interface 142 that may be referred to as the Iub interface 142. The Uu interface 140, Iu interface 144, and Iub interface 142 allow for internetworking between equipment from different vendors and are specified in the 3GPP standards. Implementation of the RNC 134 varies from vendor to vendor, and therefore will be described in general terms below.

The RNC 134 may serve as the switching and controlling element of the UTRAN 130. The RNC 134 may be located between the Iub interface 142 and the Iu interface 144. The RNC 134 may act as a service access point for all the services that the UTRAN 130 provides to the core network 106. For example, the UTRAN 130 may manage the connection between the core network 106 and a UE 102.

The RNCs 134a 134b may communicate with each other over an interface 146 that may be referred to as the Iur interface 146, which allows soft handover between cells connected to different nodes. RNCs 134 and Node Bs 136 can communicate over and be connected via the Iub interface 142. An RNC 134 may control use of the radio resources by each Node B 136 coupled to a particular RNC 134. Each Node B 136 may control one or more cells and may provide a radio link to the UE 102. The Node B 136 may perform interface processing such as channel coding and interleaving, rate adaptation and spreading.

The core network 106 may include all of the switching and routing capability for connecting to either a public switched telephone network (PSTN) (not shown) or a packet data network (PDN) (not shown). The core network 106 may also include switching and routing capability for mobility and subscriber location management and authentication services.

Figure 2:
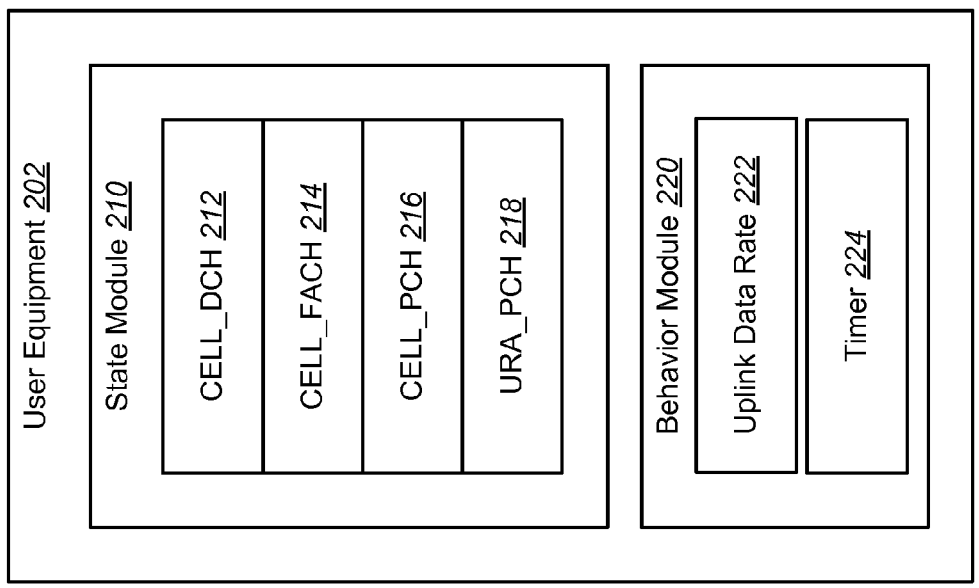
FIG. 2 is a block diagram illustrating user equipment (UE) for handling transport format combinational control (TFCC) messages.

The present disclosure relates generally to signaling messages, such as transport format combinational control (TFCC) messages. FIG. 2 is a block diagram illustrating user equipment 202 for handling TFCC messages. TFCC messages may be used to restrict the UE 202 from transmitting at certain rates. For example, TFCC messages may be used by the network to restrict the UE 202 from using certain Transport Format Combination Identifiers (TFCI) from the complete Transport Format Combination Set (TFCS), which may restrict the UE 202 from transmitting at certain rates. TFCC messages are discussed in further detail below in relation to FIG. 3.

The UE 202 may include a state module 210. The state module 210 may include the states of the UE 202 when the UE 202 is in UMTS Terrestrial Radio Access radio resource control (UTRA RRC) connected mode.

The state module 210 may include a CELL_DCH state 212. The CELL_DCH state 212 may also be referred to as a dedicated channel state. The state module 210 may also include a CELL_FACH state 214. The CELL_FACH 214 state may also be referred to as a forward access channel state. The state module 210 may also include a CELL_PCH 216 state. The state module 210 may also include a URA_PCH state 218. The CELL_PCH 216 state and the URA_PCH state 218 may also be referred to as a paging channel state or a common state. The UTRA RRC connected mode states are discussed in further detail below in relation to FIG. 7.

The UE 202 may also include a behavior module 220. The behavior module 220 may make determinations about how the UE 202 is to react upon receiving a TFCC message. The behavior module 220 may control the uplink data rate 222 of the UE 202. For example, the behavior module 220 may restrict the UE 202 from transmitting at certain rates. The behavior module 220 may also include a timer 224. The behavior module 220 may use the timer 224 to determine when to apply the TFCC message restrictions on the uplink data rate 222. For example, the behavior module 220 may use the timer 224 to determine the control frame number (CFN) at which the uplink data rate 222 is to be lowered. The behavior module 220 may also use the timer 224 to determine the CFN at which the uplink data rate 222 is to be raised after the uplink data rate 222 has been temporarily lowered. The behavior module 220 may also use the timer 224 to determine when to apply and when to remove TFCC message restrictions.

Figure 3:
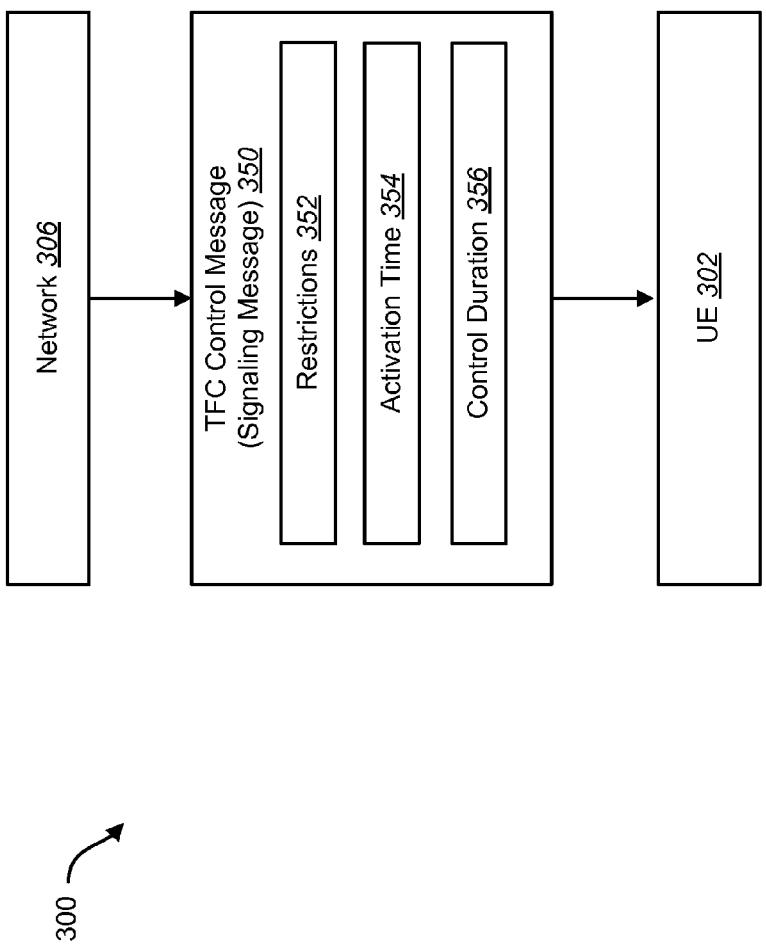
FIG. 3 illustrates an example of a system in which a network sends a TFCC message to a UE that restricts the UE from transmitting at certain rates.

FIG. 3 illustrates an example of a system 300 in which a network 306 sends a TFCC message 350 to a UE 302. The TFCC message 350 may include restrictions 352 to be applied to one or more UEs 302. For example, the TFCC message 350 may include restrictions 352 on the transmission rate of the UE 302. In one configuration, the restrictions 352 on the transmission rate of the UE 302 may include uplink data restrictions on the UE 302. The TFCC message 350 may also include an activation time 354. The activation time 354 may indicate the control frame number (CFN) at which the UE 302 applies the restrictions 352 in the TFCC message 350. The activation time 354 may also be referred to as the activation time for TFC subset. If the TFCC message 350 does not define the activation time 354, the restrictions 352 in the TFCC message 350 may be applied as soon as the UE 302 has received and processed the TFCC message 350.

The TFCC message 350 may also include a control duration 356. The control duration 356 may indicate the duration of time that the restrictions 352 in the TFCC message 350 are valid. Alternatively, the control duration 356 may indicate the CFN at which the restrictions 352 in the TFCC message 350 are no longer valid. The control duration 356 may also be referred to as the TFC control duration. If the TFCC message 350 does not define the control duration 356 or the TFCC message 350 does not include a control duration 356, the restrictions 352 in the TFCC message 350 may apply to the UE 302 until the network 306 signals to the UE 302 to use a different TFCS or the UE 302 transitions to an IDLE state. The network 306 may transmit the same TFCC message 350 to more than one UE 302. If the behavior of the UE 302 is not defined after the UE 302 receives a TFCC message 350, the UE 302 and the network 306 may become out of sync regarding TFCI restrictions. This could possibly lead to an RLC unrecoverable error and a call drop.

Figure 4:
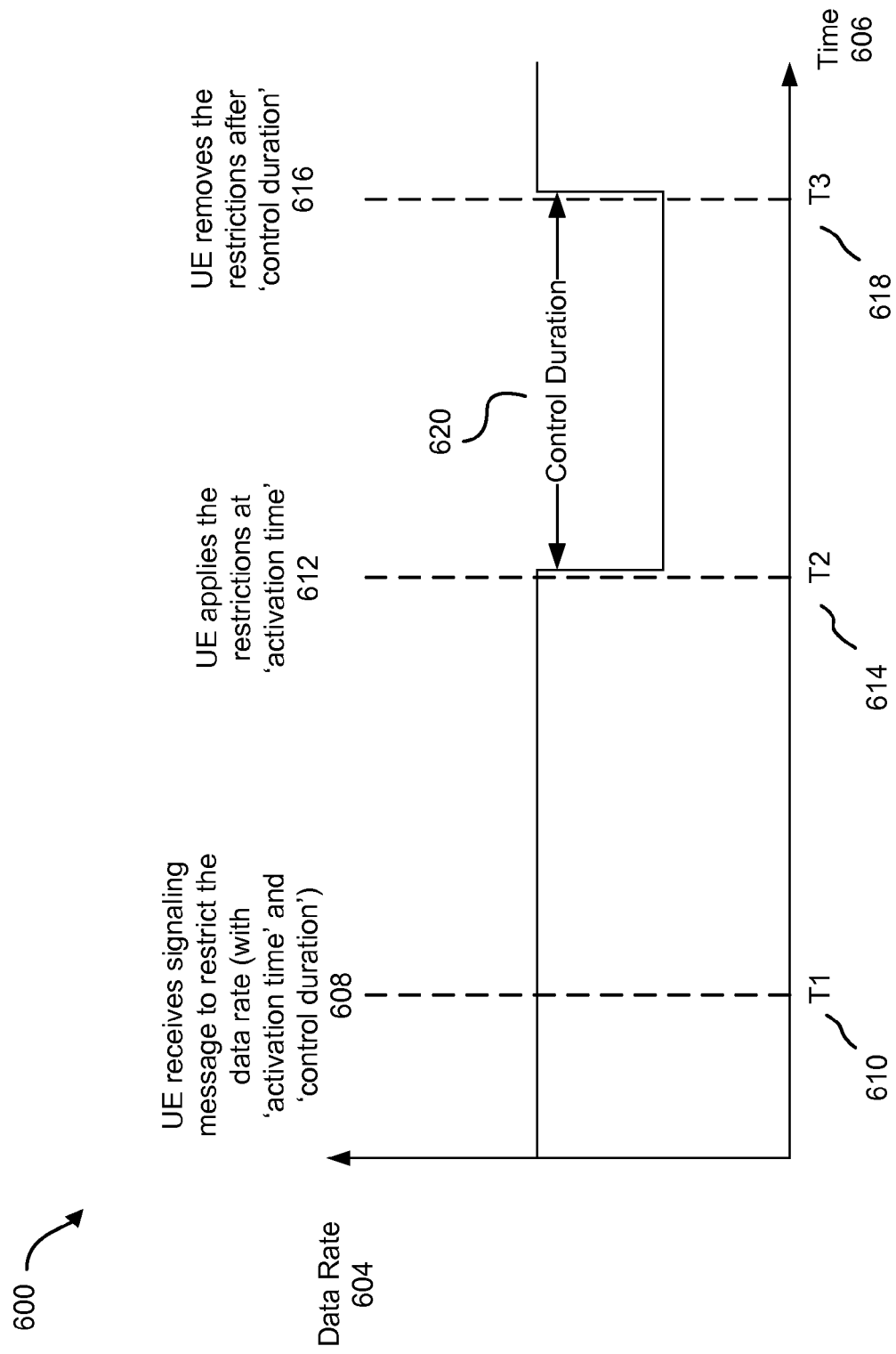
FIG. 4 illustrates an example showing the handling of a TFCC message by a UE.

FIG. 4 illustrates an example showing the handling of a TFCC message 350 by a UE 302. The graph 600 illustrates the UE's data rate 604 over time 606. At time T1 610, the UE 302 may receive 608 a signaling message 350 to restrict the data rate 604. The signaling message 350 may include an activation time 354 and a control duration 620. In this example, the activation time 354 is at time T2 614 and the control duration 620 is at time T3 618 minus time T2 614. At time T2 614, which is the activation time 354, the UE 302 applies 612 the restrictions 352 of the signaling message 350 and the data rate 604 is decreased. At time T3 618, the control duration 620 has expired and the UE 302 removes 616 the restrictions 352 of the signaling message 350 and increases the data rate 604 to the level where it was prior to receiving the signaling message restrictions 352.

Figure 5:
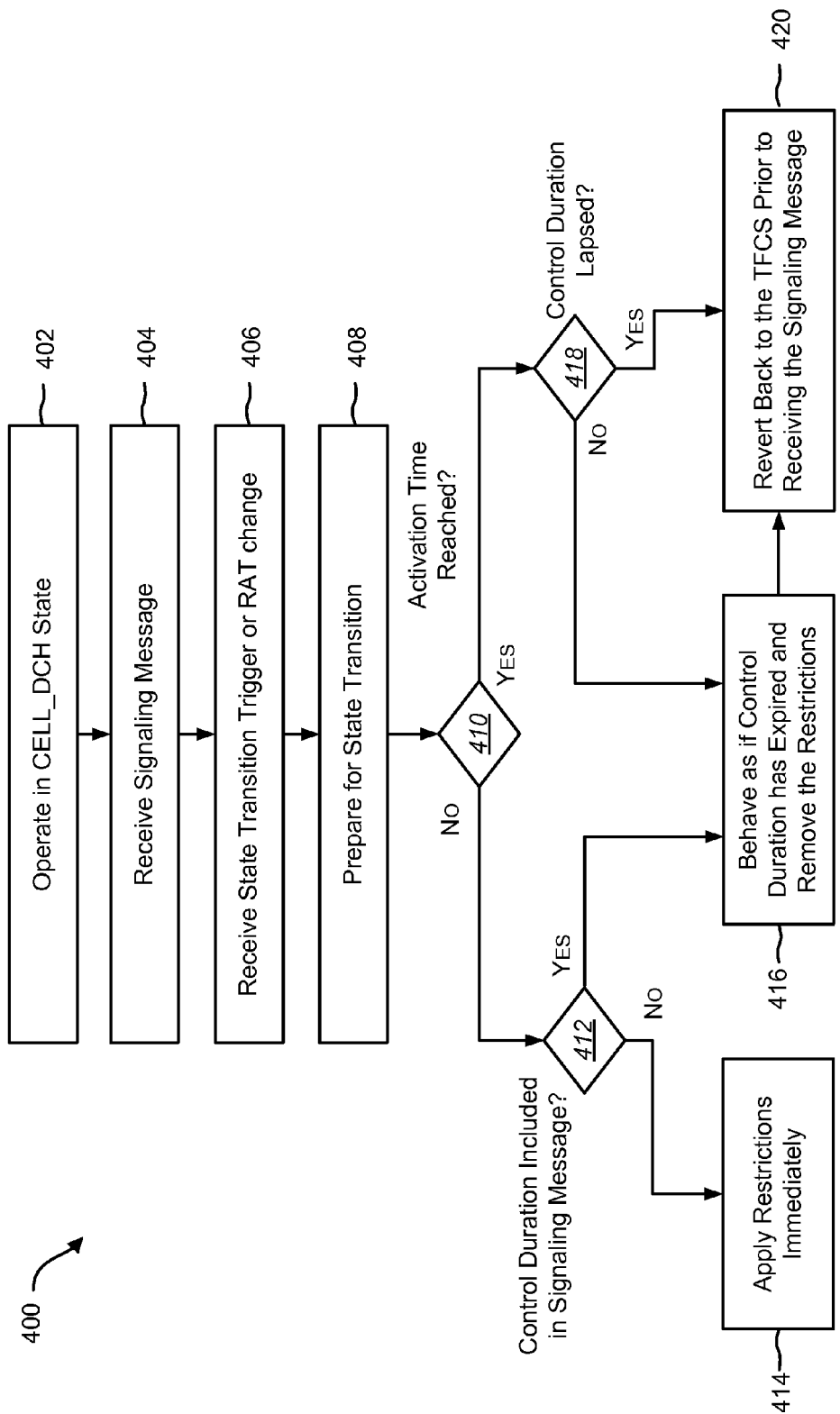
FIG. 5 is a flow diagram of a method for handling a transport format combinational control message.

FIG. 5 is a flow diagram of a method 400 for handling a transport format combinational control message 350. A UE 302 may operate 402 in CELL_DCH state 212. The UE 302 may receive 404 a signaling message 350 from the network 306. The signaling message 350 may indicate restrictions to the UE 302. For example, the signaling message 350 may indicate a restriction on the uplink data rate of the UE 302. In one configuration, the signaling message 350 may be a TFCC message 350. The signaling message 350 may include an activation time 354. The signaling message 350 may also include a control duration 356. After receiving the signaling message 350, the UE 302 may receive 406 a state transition trigger to move to a different state. In one configuration, the state transition trigger may cause the UE 302 to move to a different RRC state. RRC states are discussed in more detail below in relation to FIG. 7. Upon receiving a state transition trigger, the UE 302 may prepare 408 for the state transition. In one configuration, the UE 302 may sustain a Radio Access Technology (RAT) change instead of a state transition trigger.

When the UE 302 is preparing 408 for the state transition, the UE 302 may determine 410 whether the activation time 354 has been reached. The activation time 354 has been discussed above in relation to FIG. 3. If the activation time 354 has not been reached, the signaling message restrictions 352 have not been applied to the UE 302. The UE 302 may then determine 412 if the signaling message 350 includes a control duration 356. If the signaling message 350 includes a control duration 356, the UE 302 may behave 416 as if the control duration 356 has expired and remove the restrictions 352. The UE 302 may then revert 420 back to the Transport Format Combination Set (TFCS) that the UE 302 was in prior to receiving the signaling message 350. If the signaling message 350 does not include a control duration 356, the UE 302 may immediately apply 414 the restrictions 352 included in the signaling message 350. The UE 302 may continue using the TFCIs allowed by the TFCC message 350 until the network explicitly reconfigures the TFCS set or the UE 302 transitions to the IDLE state.

If the activation time 354 has been reached, the signaling message restrictions 352 have been applied to the UE 302. The UE 302 may then determine 418 whether the control duration 356 included in the signaling message 350 has lapsed. If the control duration 356 has lapsed, the signaling message restrictions 352 have already been removed. The UE 302 may then revert 420 back to the TFCS that the UE 302 was in prior to receiving 404 the signaling message 350. If the control duration 356 has not lapsed, the UE 302 may behave 416 as if the control duration 356 has lapsed and the UE 302 may remove the restrictions 352. The UE 302 may also revert 420 back to the TFCS that the UE 302 was in prior to receiving 404 the signaling message 350.

Figure 6:
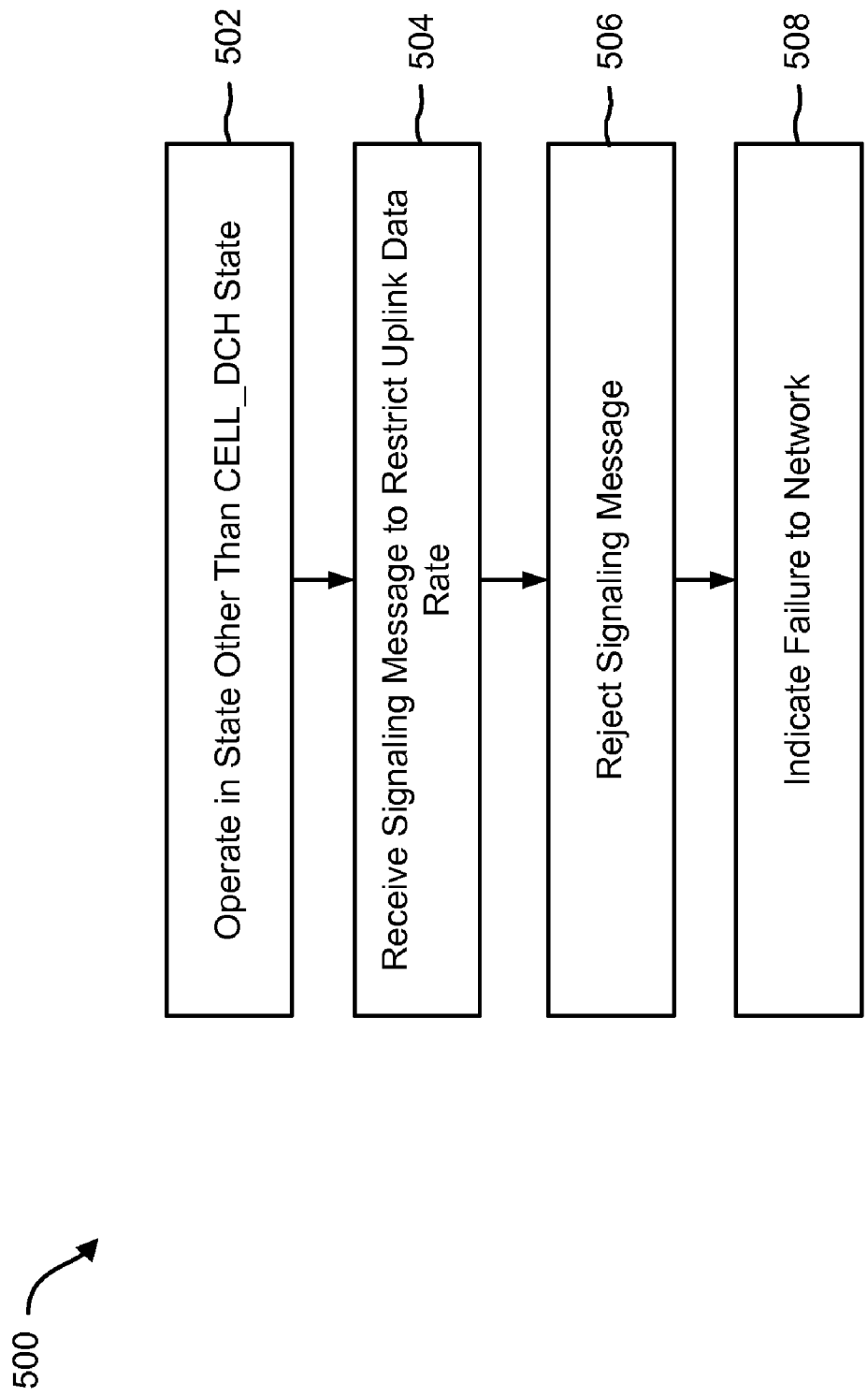
FIG. 6 is a flow diagram of another method for handling a transport format combinational control message.

FIG. 6 is a flow diagram of another method 500 for handling a transport format combinational control message. The UE 302 may operate 502 in a state other than the CELL_DCH state 212. For example, the UE 302 may operate in the CELL_FACH state 214. The UE 302 may receive 504 a signaling message 350 from the network 306. The signaling message 350 may indicate restrictions 352 to the UE 302. For example, the signaling message 350 may indicate a restriction 352 on the uplink data rate of the UE 302. In one configuration, the signaling message 350 may be a TFCC message 350. The signaling message 350 may include an activation time 354. The signaling message 350 may also include a control duration 356. Upon receiving 504 the signaling message 350 in a state other than the CELL_DCH state 212, the UE 302 may reject 506 the signaling message 350. The UE 302 may then indicate 508 this failure to the network 306.

Figure 7:
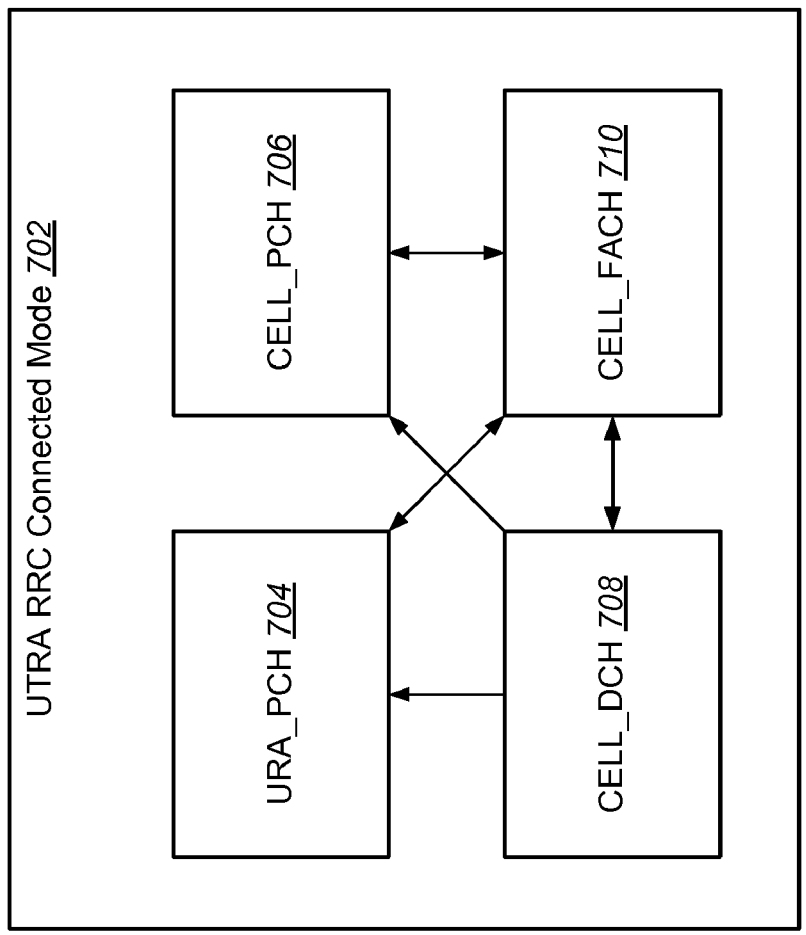
FIG. 7 shows a state diagram of various states and modes in UMTS and Global System for Mobile communications (GSM)

FIG. 7 shows a state diagram of various states and modes in UMTS and Global System for Mobile communications (GSM). The states and modes shown in FIG. 7 are only examples of some of the states and modes in which a UE 302 may operate.

Upon being powered on, the UE 302 may perform a cell selection to find a suitable cell from which to receive service. This cell is referred to as the serving cell. The UE 302 may then transition to a UMTS Terrestrial Radio Access (UTRA) Radio Resource Control (RRC) connected mode 702. The UE 302 may receive and/or transmit data with the UMTS network while in the UTRA RRC connected mode 702, depending on its RRC state and configuration.

While in the UTRA RRC connected mode 702, the UE 302 may be in one of four possible RRC states: a CELL_DCH state 708, a CELL_FACH state 710, a CELL_PCH state 706, or a URA_PCH state 704. In this context, DCH denotes dedicated transport channel, FACH denotes forward access channel, PCH denotes paging channel, and URA denotes UTRAN registration area.

In the CELL_DCH state 708, the UE 302 may communicate with the UMTS network for a voice or data call via dedicated physical channels allocated to the UE 302. In the CELL_FACH state 710, the UE 302 may exchange signaling and low rate data with the UMTS network via common channels that are shared with other UEs 302.

In the CELL_PCH state 706 and URA_PCH state 704, the UE 302 may periodically monitor the PCH for paging messages and the UE 302 is not permitted to transmit on the uplink.

In the CELL_PCH state 706, the UMTS network knows the location of the UE 302 at the cell level. The UE 302 performs a cell update with the UMTS network whenever the UE 302 moves to a new cell. In the URA_PCH state 704, the UMTS network knows the location of the UE 302 at the URA level, where a URA is a collection of cells. The UE 302 performs a URA update with the UMTS network whenever the UE 302 moves to a new URA. The UE 302 may update its location more frequently in the CELL_PCH state 706 than the URA_PCH state 704.

The UE 302 may transition from the CELL_DCH state 708 or CELL_FACH state 710 to another state in the UTRA RRC connected mode 702 by performing a reconfiguration procedure. The UE 302 may transition between different configurations in the CELL_DCH state 708 by also performing a reconfiguration procedure. The UMTS network may command the UE 302 to be in one of the four RRC states in the UTRA RRC connected mode 702 based on activity of the UE 302.

Figure 8:
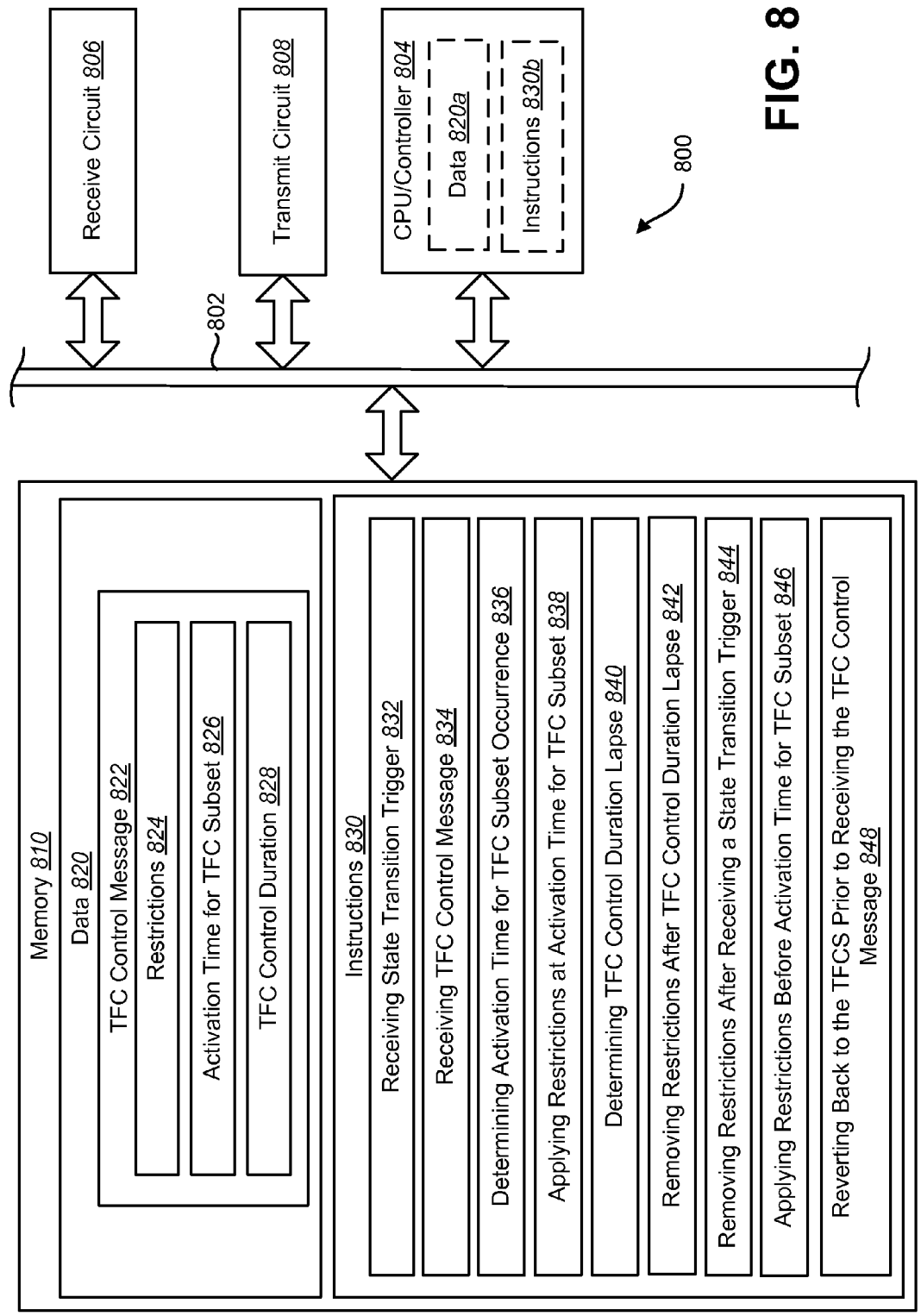
FIG. 8 illustrates various components that may be utilized in one configuration of a UE.

FIG. 8 illustrates various components that may be utilized in one configuration of a User Equipment (UE) 800. The UE 800 may include a processor or central processing unit (CPU)/controller 804. The CPU/controller 804 may be embodied as a microprocessor, a microcontroller, a digital signal processor (DSP) or other device known in the art. Memory 810, which may include both read-only memory (ROM) and random access memory (RAM), may provide instructions 830 and data 820 to the CPU/Controller 804. The memory 810 may also include portions of non-volatile random access memory (NVRAM). The CPU/controller 804 typically performs logical and arithmetic operations based on program instructions 830 stored within the memory 810. The instructions 830 in the memory 810 may be executable to implement the methods described herein. Portions of the instructions 830*a* and the data 820*a* are illustrated as being currently executed or read by the CPU/controller 804.

The data 820 in the memory 810 may include one or more Transport Format Combinational (TFC) control messages 822. Each TFC control message 822 may have been received over the network. The data 820 in the memory 810 may store a TFC control message 822 until the TFC control message 822 has expired. Alternatively, the data 820 in the memory 810 may store a TFC control message 822 until the UE 800 receives a new TFC control message 822. The TFC control message 822 may include restrictions 824 pertaining to the UE 800. For example, the TFC control message 822 may include restrictions 824 on the uplink data rate of the UE 800. The TFC control message 822 may also include an activation time for TFC subset 826. The activation time for TFC subset 826 may indicate the control frame number (CFN) at which the restrictions 824 in the TFC control message 822 are applied to the UE 800. The TFC control message 822 may also include a TFC control duration 828. The TFC control duration 828 may indicate the duration of time that the TFC control message 822 restrictions 824 are applicable to the UE 800.

The instructions 830 in the memory 810 may include instructions 830 for receiving 832 state transition triggers. State transitions have been discussed in more detail above in relation to FIG. 7. The instructions 830 in the memory 810 may also include instructions 834 for receiving a TFC control message. The instructions 830 in the memory 810 may also include instructions 836 for determining the activation time for TFC subset occurrence. The instructions 830 in the memory 810 may also include instructions 838 for applying the restrictions of the TFC control message at the activation time for TFC subset to the UE 800. The instructions 830 in the memory 810 may also include instructions 840 for determining the TFC control duration expiration. The instructions 830 in the memory 810 may also include instructions 842 for removing the restrictions 824 of the TFC control message 822 after the expiration of the TFC control duration 828. The instructions 830 in the memory 810 may also include instructions 844 for removing the restrictions 824 of the TFC control message after receiving a state transition trigger. The instructions 830 in the memory 810 may also include instructions 846 for applying the restrictions 824 before the activation time for TFC subset 826 has been reached. The instructions 830 in the memory 810 may also include instructions 848 for reverting back to the TFCS prior to receiving the TFC control message 848.

The UE 800 may include a central data bus 802 linking several circuits together. The circuits may include the CPU/controller 804, a receive circuit 806, a transmit circuit 808, and memory 810.

The receive circuit 806 and transmit circuit 808 may be connected to an RF (Radio Frequency) circuit (not shown). The receive circuit 806 may process and buffer received signals before sending the signals out to the data bus 802. On the other hand, the transmit circuit 808 may process and buffer the data from the data bus 802 before sending the data out of the UE 800. The CPU/controller 804 may perform the function of data management of the data bus 802 and further the function of general data processing, including executing the instructional contents of the memory 810.

The memory 810 can be tied to another memory circuit (not shown) which can either be of the volatile or nonvolatile type. As an alternative, the memory 810 can be made of other circuit types, such as an EEPROM (Electrically Erasable Programmable Read Only Memory), an EPROM (Electrical Programmable Read Only Memory), an ASIC (Application Specific Integrated Circuit), a magnetic disk, an optical disk, and others well known in the art.

It should be further be noted that the inventive processes as described can also be coded as computer-readable instructions carried on any computer-readable medium known in the art. In this specification and the appended claims, the term "computer-readable medium" refers to any medium that participates in providing instructions to any processor, such as the CPU/controller 804 shown and described in the drawing figure of FIG. 8, for execution. Such a medium can be of the storage type and may take the form of a volatile or non-volatile storage medium as also described previously, for example, in the description of the memory 810 in FIG. 8.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s). For example, the terms "code" and "instructions" may refer to one or more programs, routines, sub-routines, functions, procedures, etc.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that means for performing the methods and techniques described herein, such as those illustrated by FIGS. 4 and 5, can be downloaded and/or otherwise obtained by a subscriber station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a subscriber station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for handling a signaling message that relates to transmission rate restrictions, the method being implemented by user equipment, the method comprising:
   operating in a first state;
   receiving the signaling message from a network, wherein the signaling message includes an activation time and the transmission rate restrictions;
   receiving a state transition trigger to operate in a second state; and
   determining the user equipment's behavior regarding the transmission rate restrictions upon receiving the state transition trigger;
   wherein determining the user equipment's behavior regarding the transmission rate restrictions upon receiving the state transition trigger comprises determining whether the activation time has been reached.

2. The method of claim 1, wherein the signaling message is a transport format combinational control (TFCC) message.

3. The method of claim 1, wherein the activation time has not been reached and wherein determining the user equipment's behavior regarding the transmission rate restrictions upon receiving the state transition trigger further comprises determining whether the signaling message includes a control duration.

4. The method of claim 3, wherein the signaling message includes the control duration and further comprising immediately applying the transmission rate restrictions.

5. The method of claim 3, wherein the signaling message does not include the control duration and further comprising behaving as if the control duration has lapsed and removing the transmission rate restrictions.

6. The method of claim 5, further comprising reverting back to a transmission rate that the user equipment had prior to receiving the signaling message.

7. The method of claim 1, wherein the activation time has been reached and wherein determining the user equipment's behavior regarding the transmission rate restrictions upon receiving the state transition trigger further comprises determining whether a control duration included in the signaling message has lapsed.

8. The method of claim 7, wherein the control duration has not lapsed and further comprising behaving as if the control duration has lapsed and removing the transmission rate restrictions.

9. The method of claim 8, further comprising reverting back to a transmission rate that the user equipment had prior to receiving the signaling message.

10. The method of claim 7, wherein the control duration has lapsed and further comprising reverting back to a transmission rate that the user equipment had prior to receiving the signaling message.

11. The method of claim 1, wherein the first state is a CELL_DCH state.

12. The method of claim 1, wherein the transmission rate restrictions apply to an uplink data rate.

13. User equipment that is configured to handle a signaling message that relates to transmission rate restrictions, comprising:
 a processor; and
 circuitry coupled to said processor configured to:
  operate in a first state;
  receive the signaling message from a network, wherein the signaling message includes an activation time and the transmission rate restrictions;
  receive a state transition trigger to operate in a second state; and
  determine the user equipment's behavior regarding the transmission rate restrictions upon receiving the state transition trigger;
 wherein determining the user equipment's behavior regarding the transmission rate restrictions upon receiving the state transition trigger comprises determining whether the activation time has been reached.

14. The user equipment of claim 13, wherein the signaling message is a transport format combinational control (TFCC) message.

15. The user equipment of claim 13, wherein the activation time has not been reached and wherein determining the user equipment's behavior regarding the transmission rate restrictions upon receiving the state transition trigger further comprises determining whether the signaling message includes a control duration.

16. The user equipment of claim 15, wherein the signaling message includes the control duration and wherein the circuitry coupled to the processor is further configured to immediately apply the transmission rate restrictions.

17. The user equipment of claim 15, wherein the signaling message does not include the control duration and wherein the circuitry coupled to the processor is further configured to behave as if the control duration has lapsed and remove the transmission rate restrictions.

18. The user equipment of claim 17, wherein the circuitry coupled to the processor is further configured to revert back to a transmission rate that the user equipment had prior to receiving the signaling message.

19. The user equipment of claim 13, wherein the activation time has been reached and wherein determining the user equipment's behavior regarding the transmission rate restrictions upon receiving the state transition trigger further comprises determining whether a control duration included in the signaling message has lapsed.

20. The user equipment of claim 19, wherein the control duration has not lapsed and wherein the circuitry coupled to the processor is further configured to behave as if the control duration has lapsed and remove the transmission rate restrictions.

21. The user equipment of claim 20, wherein the circuitry coupled to the processor is further configured to revert back to a transmission rate that the user equipment had prior to receiving the signaling message.

22. The user equipment of claim 19, wherein the control duration has lapsed and wherein the circuitry coupled to the processor is further configured to revert back to a transmission rate that the user equipment had prior to receiving the signaling message.

23. The user equipment of claim 13, wherein the first state is a CELL_DCH state.

24. The user equipment of claim 13, wherein the transmission rate restrictions apply to an uplink data rate.

25. User equipment that is configured to handle a signaling message that relates to transmission rate restrictions, comprising:
 means for operating in a first state;
 means for receiving the signaling message from a network, wherein the signaling message includes an activation time and the transmission rate restrictions;
 means for receiving a state transition trigger to operate in a second state; and
 means for determining the user equipment's behavior regarding the transmission rate restrictions upon receiving the state transition trigger;
 wherein the means for determining the user equipment's behavior regarding the transmission rate restrictions upon receiving the state transition trigger comprise means for determining whether the activation time has been reached.

26. The user equipment of claim 25, wherein the signaling message is a transport format combinational control (TFCC) message.

27. The user equipment of claim 25, wherein the first state is a CELL_DCH state.

28. The user equipment of claim 25, wherein the transmission rate restrictions apply to an uplink data rate.

29. A computer-program product for handling a signaling message that relates to transmission rate restrictions, the computer-program product comprising a computer-readable medium having instructions thereon, the instructions comprising:
 code for operating in a first state;
 code for receiving the signaling message from a network, wherein the signaling message includes an activation time and the transmission rate restrictions;
 code for receiving a state transition trigger to operate in a second state; and
 code for determining the user equipment's behavior regarding the transmission rate restrictions upon receiving the state transition trigger;
 wherein the code for determining the user equipment's behavior regarding the transmission rate restrictions upon receiving the state transition trigger comprises code for determining whether the activation time has been reached.

30. The computer-program product of claim 29, wherein the signaling message is a transport format combinational control (TFCC) message.

31. The computer-program product of claim 29, wherein the first state is a CELL_DCH state.

32. The computer-program product of claim 29, wherein the transmission rate restrictions apply to an uplink data rate.

* * * * *